United States Patent [19]

Johnson

[11] 4,418,168

[45] Nov. 29, 1983

[54] PROCESS FOR IMPARTING STABILITY TO PARTICULATE VINYLIDENE CHLORIDE POLYMER RESINS

[75] Inventor: Earl H. Johnson, Midland, Mich.

[73] Assignee: The Dow Chemical Company, Midland, Mich.

[21] Appl. No.: 359,347

[22] Filed: Mar. 18, 1982

[51] Int. Cl.³ .......................... C08K 5/15; C08K 5/36; C08L 27/08

[52] U.S. Cl. .................... 524/109; 524/127; 524/146; 524/349; 524/556; 524/562; 524/568

[58] Field of Search .............. 524/109, 568, 127, 562, 524/556, 146, 349

[56] References Cited

U.S. PATENT DOCUMENTS

| | | | |
|---|---|---|---|
| 2,160,948 | 6/1939 | Wiley et al. | 524/568 |
| 2,477,613 | 8/1949 | Irons | 524/568 |
| 2,477,614 | 8/1949 | Irons | 524/568 |
| 2,558,728 | 7/1951 | Britton et al. | 524/239 |
| 2,577,635 | 12/1951 | Serdynsky et al. | 524/568 |
| 2,753,321 | 7/1956 | Jankens | 524/568 |
| 2,789,100 | 4/1957 | Wilson | 524/148 |
| 2,789,101 | 4/1957 | Wilson | 524/148 |
| 3,255,136 | 6/1966 | Hecker et al. | 524/151 |
| 3,798,195 | 3/1974 | Watson | 524/113 |
| 3,882,081 | 5/1975 | Baker | 524/358 |
| 4,123,477 | 10/1978 | Watanabe et al. | 525/192 |

FOREIGN PATENT DOCUMENTS

| | | |
|---|---|---|
| 520550 | 1/1956 | Canada ........................ 524/568 |
| 1164092 | 9/1969 | United Kingdom . |
| 1325496 | 8/1973 | United Kingdom . |

*Primary Examiner*—Ronald W. Griffin
*Attorney, Agent, or Firm*—D. R. Howard

[57] ABSTRACT

Improved stability is imparted to suspension and emulsion polymerized dry particulate vinylidene chloride resin by adding thereto a dispersion of an oil insoluble inorganic particulate stabilizing additive in a liquid plasticizer/stabilizer medium with sufficient mixing to ensure generally uniform distribution of the dispersion onto the resin particles. Optionally, a hindered phenol may be incorporated into the dispersion.

16 Claims, No Drawings

PROCESS FOR IMPARTING STABILITY TO PARTICULATE VINYLIDENE CHLORIDE POLYMER RESINS

BACKGROUND OF THE INVENTION

The present invention relates to an improved process for imparting stability against decomposition to particulate vinylidene chloride copolymer resins and to the particulate vinylidene chloride resins by the improved process. As used herein, the term vinylidene chloride includes polyvinylidene chloride as well as copolymers and interpolymers having polymerized therein at least a major portion of vinylidene chloride.

Vinylidene chloride polymers and methods of preparation thereof are widely reported in patents and other literature. Perhaps as widely reported are the tendencies of vinylidene chloride polymers to discolor and to cross-link and gel when subjected to elevated temperatures, particularly when in the presence of even trace amounts of certain metal salts, particularly iron salts. The metal salt impurities may be present as a result of contact of the polymer with metal polymerization or processing equipment, or may be acquired from water used as the polymerization medium or are present as impurities in various modifiers added to the polymer. Such impurities are not easily removed from the polymer by usual washing methods.

An effective stabilizer for haloethylene polymers in general and vinylidene chloride polymers in particular must satisfy the following requirements, especially when the polymers are subjected to the presence of metal salts: (1) react with evolved hydrochloric acid to prevent attack on iron or other metal with which the polymer comes in contact; (2) react with an iron (or other metal) and dissolve or precipitate such metal as an insoluble compound; and (3) react as a chain terminating agent or scavenger for polymer free radicals.

A particular stabilizer composition may have a number of ingredients. Some ingredients, when used alone and in excess, will not only fail to impart stability to the polymer but will actually hasten, or contribute to, degradation thereof. Accordingly, a careful balancing of stabilizer composition ingredients and amounts thereof is required. Known stabilizers, some of which may have more than one function, include organic polyhydric phenols, organic phosphites, metal salts of fatty carboxylic acids, polyphosphates, alkyltin polysulfide thioesters and other organo-tin compounds, lead compounds, epoxy compounds, thiodipropionic acid esters, mononuclear aromatic quinone compounds and the like.

It is known that many stabilizers exhibit more than one function. Epoxides, for example, are believed to act both as hydrochloric acid acceptors and as chelating agents. They may also have some antioxidant activity. Other acid acceptors commonly used include magnesium oxide, tetrasodium pyrophosphate, metal salts of fatty carboxylic acids and organo-tin compounds.

It is known that alkali metal polyphosphate salts, such as tetrasodium pyrophosphate in a very finely ground form have been dry blended with film-forming particulate vinylidene chloride polymer resins. This has been less than satisfactory for a number of reasons. First, the finely ground alkali metal polyphosphate salts have a light powdery consistency and are hydroscopic, a combination which favors formation of agglomerates. Second, any agglomerates which do form are difficult to filter out because the powdered alkali metal polyphosphate salts tend to clog or blind filter screens. Third, those agglomerates which are not filtered out tend to show up as white specks in extruded tape or film formed from the vinylidene chloride copolymer resin. The white specks are unsatisfactory not only from an appearance standpoint but from a film performance standpoint as some agglomerates or white specks are large enough to cause formation of holes in the film. Fourth, notwithstanding the potential for agglomerate formation, there is also a problem of ensuring generally uniform distribution of the salts upon the resin particles. Such a problem may result in some polymer resin having no stabilizer salts in contact therewith.

It is also known that after dry blending such alkali metal polyphosphate salts with the film-forming particulate vinylidene chloride polymer resins, plasticizers such as epoxidized soybean oil are added by conventional techniques to aid in processing of the resins. While such plasticizers admittedly aid in resin processing, they generally do not aid in dispersion or distribution of previously added particulate or powdery stabilizers such as the alkali metal polyphosphate salts.

SUMMARY OF THE INVENTION

It would be desirable if there were available a process for adding stabilizers to particulate haloethylene polymer resins which ensured generally uniform distribution of the stabilizers generally in and on the resin particles.

It would also be desirable if there were available a process for adding stabilizers to particulate haloethylene polymer resins which resulted in a marked reduction in stabilizer agglomerates.

It would further be desirable if there were available a simple yet effective process for adding stabilizers to particulate haloethylene polymer resins.

These and other objects are realized in a method for imparting stability against decomposition to a particulate copolymer resin having particles, the copolymer having polymerized therein a major amount of vinylidene chloride and at least one monoethylenically unsaturated monomer copolymerizable therewith, stability being imparted by blending an effective amount of at lease one oil insoluble particulate inorganic stabilizer with the resin, the improvement comprises forming a generally uniform dispersion of the stabilizer in a liquid plasticizer, the dispersion then being placed generally on and/or in the resin particles.

Also contemplated as being within the scope of the present invention is a particulate copolymer resin having particles and improved stability against decomposition, the copolymer having polymerized therein a major amount of vinylidene chloride and at least one monoethylenically unsaturated monomer copolymerizable therewith, the copolymer being in admixture with an effective amount of at least one oil insoluble particulate inorganic stabilizer, the improvement being imparted by first forming a generally uniform dispersion of the stabilizer in a liquid plasticizer dispersing medium and then placing the dispersion generally on and/or in the resin particles.

By following the teachings of the present invention, the oil insoluble particulate inorganic stabilizer is readily dispersed in the liquid dispersing medium. In addition, the particulate stabilizer is easily filtered after dispersion to remove particulate agglomerates whereas the same stabilizer in dry form is virtually impossible to filter in that it blinds filter screens. The dispersed additive is more uniformly distributed throughout the resin being stabilized than is the case with dry blending the same additive. Further, a reduction of agglomerates or an elimination thereof necessarily reduces or eliminates the number of specks of additive in film produced from the resin as well as holes in such a film caused by the specks of additive.

DESCRIPTION OF THE PREFERRED EMBODIMENTS

The haloethylene polymers contemplated by the present invention include the various polymers and interpolymers of vinylidene and vinyl halides including, especially, the normally crystalline polymers of vinylidene chloride.

Typical of such normally crystalline vinylidene chloride polymers are those having polymerized therein from about 70 to about 95 percent by weight of vinylidene chloride with the remainder comprising one or more monoethylenically unsaturated monomers copolymerizable therewith.

Exemplary copolymerizable ethylenically unsaturated comonomers which can be utilized in the present invention include the alkyl esters of acrylic and methacrylic acids such as methyl acrylate and methyl methacrylate; hydroxyalkyl esters of acrylic and methacrylic acids such as hydroxypropyl acrylate, hydroxyethyl acrylate, and hydroxybutyl acrylate; vinyl esters of saturated carboxylic acids such as vinyl acetate; amides of ethylenically unsaturated carboxylic acids such as acrylamide; nitriles of ethylenically unsaturated carboxylic acid such as acrylonitrile and methacrylonitrile; ethylenically unsaturated carboyxlic acids such as acrylic acid; ethylenically unsaturated alcohols such as allyl alcohol; vinyl halides such as vinyl chloride and vinyl bromide; and other ethylenically unsaturated monomers known to polymerize with vinylidene chloride. The monoethylenically unsaturated copolymerizable with vinylidene chloride is suitably selected from the group consisting of methyl acrylate, butyl acrylate, methyl methacrylate, acrylic acid, methacrylic acid, itaconic acid and vinyl chloride.

The normally crystalline vinylidene chloride polymers are suitably prepared by aqueous suspension and emulsion polymerization processes which are well-known in the art. Beneficially, the vinylidene chloride polymers suitable for use in accordance with the present invention are prepared by aqueous suspension polymerization. Such polymers beneficially have an average particle diameter of from about 50 to about 500 microns, desirably from about 150 to about 350 microns. The vinylidene chloride polymer particles may also be pelletized prior to stabilization.

The oil insoluble particulate inorganic stabilizers which can be utilized in the present invention include the alkali metal polyphosphate salts such as the alkali metal pyrophosphates of which tetrasodium pyrophosphate is preferred. Other pyrophosphates include methyl trisodium pyrophosphate, diisoamyl dipotassium pyrophosphate and the like. Suitable results may also be obtained with organometallic polyphosphates which include the tripolyphosphates such as t-butyl tetrapotassium tripolyphosphate and the like; and tetrapolyphosphates such as triethyl tripotassium tetrapolyphosphate and the like. As hereinabove noted, the alkali metal polyphosphate is beneficially a pyrophosphate, desirably anhydrous tetrasodium pyrophosphate. The particulate inorganic stabilizers suitably have an average particle diameter which is less than or equal to the average particle diameter of the vinylidene chloride copolymer resin being stabilized. Persons skilled in the art will recognize that stabilizer effectiveness is generally related to surface area of stabilizer available. Such persons will also recognize that, for a given amount of stabilizer, as stabilizer particle size decreases available surface area increases. For purposes of the present invention, the particulate inorganic stabilizer beneficially has a weight average particle diameter of from about 5 to about 25 micron.

The polyphosphates suitable for purposes of the present invention are prepared by processes well-known in the art. By way of illustration only, such polyphosphates can be prepared by reacting, in the presence of water, phosphorous pentoxide, the desired aliphatic alcohol and the desired metal oxide or hydroxide.

The liquid plasticizer dispersing media which can be utilized in the present invention are organic liquids generally considered to be nonvolatile at temperatures of less than 100° Centigrade, e.g., monomeric or polymeric esters of mono- and difunctional acids and alcohols; esters of mono- and difunctional acids and etheralcohols; and esters of alcohols and phosphoric acid. Other known liquid plasticizers which may be suitable include citric acid derivatives such as acetyl tributyl citrate; glycol derivatives such as triethylene glycol dipelargonate; phosphoric acid derivatives such as tricresyl phosphate; phthalic acid derivatives such as dioctyl phthalate and dibutoxyethyl phthalate; epoxy derivatives such as glycidyl oleate; epoxy resins such as epoxidized soybean oil and epoxidized linseed oil; ricinoleic acid derivatives such as methyl acetylricinoleate; sebacic acid derivatives such as dibutyl sebacate; adipic acid derivatives such as dibutoxyethyl adipate; benzoic acid derivatives such as diethylene glycol dibenzoate; and fumaric acid derivatives such as dibutyl fumarate. The foregoing is not intended to be either exhaustive or exclusive. Suitable plasticizers are simply those which are liquid and compatible with vinylidene chloride polymers useful for purposes of the present invention. Desirably, the plasticizer is selected from the group consisting of epoxidized soybean oil and epoxidized linseed oil. Persons skilled in the art will recognize that the amount of plasticizer used depends upon a number of variables which include the plasticizer selected, compatibility of the plasticizer with the polymer, and degree of plasticization required. Suitably, when the plasticizer is an epoxy compound such as epoxidized soybean oil, the amount of plasticizer is from about 0.2 to about 3 percent by weight based on weight of resin.

Other stabilizing additives may be used in conjunction with the dispersion of one or more oil insoluble particulate inorganic stabilizers in a liquid plasticizer dispersing medium so long as two conditions are met. First, such other stabilizing additives must not have an adverse affect upon the polymer being stabilized. Second, such other stabilizing additives must not adversely affect the dispersibility of the aforementioned oil insoluble particulate inorganic stabilizers in the dispersing medium. Illustrative of such other stabilizing additives are hindered alkyl-substituted or monohydric phenols, hindered polyphenols and hindered bisphenols. Suitable hindered monohydric phenols include 2,6-di-tertiary-butyl-4-methyl phenol, 2-tertiary-butyl-4-methoxy phenol, dinonyl phenol and the like. Suitable hindered bisphenols include 2,2'-methylenebis(4-methyl-6-tertiary-butylphenol) and the like. Such other stabilizing additives are added, if at all, in minor amounts, suitably less than about 1 percent by weight of copolymer resin weight, beneficially less than about 0.6 percent by weight of copolymer resin weight, preferably from about 0.01 to about 0.5 percent by weight of copolymer resin weight. The other stabilizing additives, when used, are suitably added to the oil insoluble inorganic particulate stabilizer in the liquid plasticizer dispersing medium before application thereof to a mass of particulate vinylidene chloride copolymer resin as hereinafter described. Beneficial results are obtained by adding from about 0.01 to about 0.5 percent by weight of 2,6-di-tertiary-butyl-4-methyl phenol, based on copolymer resin weight, to the dispersing medium together with the oil insoluble particulate inorganic stabilizer or stabilizers.

Persons skilled in the art will recognize that hindered phenols other than those listed herein will also impart stability to vinylidene chloride copolymer resins. Such persons will also recognize, however, that some hindered phenols are not either colorless or white but are brown or black. A brown or black color is generally unsuitable where a clear polymeric film is desired.

In accordance with the present invention, an effective amount of an oil insoluble particulate inorgaic stabilizer is placed in generally uniform admixture with a liquid plasticizer or dispersing medium to form a stabilizer dispersion. The particulate inorganic stabilizers and the dispersing media are hereinabove set forth. Persons skilled in the art will recognize that many of the dispersing media are sufficiently viscous at room temperature to render an attempt to disperse a particulate additive therein quite difficult. Such persons will also recognize that dispersing media viscosity is generally reduced by heating of the media and that dispersion of a particulate additive therein is thereby easier. Accordingly, it is beneficial to heat the dispersing media to a temperature of greater than about 50° Centigrade. Desirably the dispersing media is heated to a temperature of from about 55° to about 75° Centigrade, preferably from about 65° to about 70° Centigrade.

The effective amount of oil insoluble particulate inorganic stabilizer will vary depending upon the stabilizer selected. Suitably, the amount of stabilizer is from about 0.1 to about 10 percent by weight of resin, beneficially from about 0.1 to about 5 percent by weight of resin, and desirably from about 0.5 to about 3.0 percent by weight of resin.

In preparing a stabilizer dispersion, the ratio of particulate inorganic stabilizer to dispersing medium may vary over a wide range but is beneficially in the range of from about 0.5:1 to about 3:1.

The stabilizer dispersion is suitably added to a mass of particulate vinylidene chloride copolymer resin by any means which results in a generally uniform distribution of the particulate inorganic stabilizer within the resin mass. By way of illustration only, a suitable means is to spray the stabilizer dispersion onto the mass of resin while said resin mass is being blended or agitated by using a mechanical blending or mixing apparatus. Illustrative blending apparatus include tumble blenders, ribbon blenders, high intensity blenders and conical blenders. Beneficially, the resin mass is heated to a temperature of from about 35° to about 60° Centigrade to enhance distribution of the stabilizer dispersion within the resin mass. Desirably, the resin mass is heated to a temperature of about 50° Centigrade.

The resin mass after stabilization is then suitable for further processing by known methods. One such method involves extrusion of the resin mass to prepare a vinylidene chloride copolymer film. The resin mass after stabilization may be further blended with a second mass of particulate vinylidene chloride copolymer resin to impart stability thereto. A suitable blending means for such further blending is a conical blender, although a tumble blender, a high intensity blender or a ribbon blender is also satisfactory. After such further blending, the resin mass is also suitable for further processing by known methods.

The following examples illustrate the manner in which the principles of the invention are applied but are not to be construed as limiting the scope of the invention. All parts and percentages are on a weight basis unless otherwise stated.

| Materials | |
|---|---|
| Resin | A vinylidene chloride polymer having polymerized therein 91.5 percent vinylidene chloride, based on weight of polymer, and 8.5 percent methyl acrylate, based on weight of polymer. The polymer had a volume average particle diameter of about 280 microns and a mean particle diameter of about 230 microns. The polymer had a relative solution viscosity as a one percent solution in tetrahydrofuran of about 0.93. |
| Code | Additive |
| A | Anhydrous tetrasodium pyrophosphate (TSPP), a powdered food grade sodium polyphosphate ground or micronized to an average particle diameter of about 13 microns. |
| B | 2,6-di-tertiary-butyl-4-methylphenol, a hindered phenol commercially available under the trade designation IONOL TM from Shell Chemical Company. |
| C | A high oxirane (9% minimum) epoxidized triglycerine commercially available under the trade designation EPOXOL TM 9-5 from Swift & Company. |
| D | An epoxidized soybean oil plasticizer commercially available under the trade designation PARAPLEX TM G-62 from Rohm & Haas Co. |
| Additive Blending Methods | |
| DRY | Anhydrous particulate TSPP is added to a dry particulate resin while the resin is being blended using a mechanical blending apparatus such as a tumble blender, a Hobart Blender or a high intensity blender such as that available from Welex, Inc., under the trade designation model 35M high intensity blender. |
| WET | Anhydrous particulate TSPP is added to water to make a slurry. The slurry is then added by spraying onto a dry particulate resin while the resin is being blended in the same manner as with the DRY method detailed above. The resin must then be dried to remove the water added with the TSPP. |
| DISPERSION | An epoxidized additive such as C or D above is heated, with agitation, to a temperature of 70° Centigrade while adding anhydrous particulate TSPP thereto at a rate sufficient to form a generally uniform dispersion. Other additives, such as B above, may also be added to the epoxidized additive in this manner. The dispersion is then added by spraying onto dry particulate resin while the resin is being blended in the same manner as with the DRY method detailed above. |
| SPRAY | A liquid additive was sprayed onto a dry particulate resin while the resin is being blended in the same manner as with the DRY method detailed above. |

Evaluation of Blending Methods

Film samples were prepared from the vinylidene chloride/methyl acrylate resin described above containing either no additives or varying types of additives, the additives being added by one of the additive blending methods described herein. A two-stage ¾ inch diameter extruder having a length to diameter ratio of 24 to 1 in conjunction with a slit die having a generally rectangular opening of 1 inch in width and 0.05 inch in height was used to prepare the film samples. The first stage, the second stage and the die had a set temperature of 185° Centigrade. The extruder was operated at a speed of 40 revolutions per minute.

The film samples so prepared were visually examined for the presence or absence of particulate agglomerates or white specks. The film samples were also rated for color based upon an arbitrary color rating scheme which is set forth in Table I below. The presence or absence of particulate agglomerates in each film sample as well as the color grade thereof are tabulated at Table II.

TABLE I

| Rating | Color Rating Scale Description |
|---|---|
| 1 | Very Light Tan |
| 3 | Light Brown |
| 5 | Dark Brown, almost Black |

TABLE II

Blending Method Evaluation

| Sample No. | Additive Type | Additive Amount[1] | Blending Method | Color Grade | Agglomerates | Remarks |
|---|---|---|---|---|---|---|
| 1 | N/A | N/A | N/A | | | Base resin |
| 2 | None | None | N/A | 5 | No | |
| 3 | A | 2 | DRY | 3 | Yes | |
| 4 | A | 1 | WET | 1 | No | |
| 5 | A | 1 | DRY | 3 | Yes | Dry blend of A followed by spraying of D |
| | D | 0.5 | | | | |
| 6 | A | 1 | WET | 1 | No | Wet blend of A followed by spraying of C |
| | C | 1 | | | | |
| 7* | A | 1 | DISPERSION | 1 | No | |
| | C | 1 | | | | |
| 8* | A | 1 | DISPERSION | 1 | No | |
| | B | 0.5 | | | | |
| | C | 1 | | | | |

*The invention.
[1]Based on weight of resin.

The data presented in the foregoing table makes a number of points. First, the technique of dispersing the stabilizing additive (TSPP) in an epoxidized liquid additive (the invention) imparts greater stability, as reflected by Color Grade, to the resin than the dry blending technique. Second, the technique of the invention is generally equivalent in terms of residual vinylidene chloride monomer to the WET blending method. The invention does not, however, require that the resin undergo a drying step as is required in the WET blending method.

Similar results are obtained by varying ratios of TSPP in the epoxidized liquid additive over the range of 0.5:1 to 3:1. Similar results are also obtained with other alkali metal polyphosphate salts and other liquid additives or plasticizers, both of which are described herein. In addition, similar results are obtained with varying amounts of the hindered phenols described herein.

What is claimed is:

1. In a method for imparting stability against decomposition to a particulate copolymer resin, the copolymer having polymerized therein a major amount of vinylidene chloride and at least one monoethylenically unsaturated monomer copolymerizable therewith, stability being imparted by blending an effective amount of at least one oil insoluble particulate inorganic stabilizer with the resin, the improvement comprises forming a generally uniform dispersion of the stabilizer in a liquid plasticizer, the dispersion then being placed generally on and/or in the resin particles.

2. The method of claim 1 wherein the monoethylenically unsaturated monomer is selected from the group consisting of methyl acrylate, butyl acrylate, methyl methacrylate, acrylic acid, methacrylic acid, itaconic acid and vinyl chloride.

3. The method of claim 1 wherein the inorganic stabilizer is tetrasodium pyrophosphate.

4. The method of claim 1 wherein the effective amount of stabilizer is from about 0.1 to about 10.0 percent by weight of copolymer resin weight.

5. The method of claim 1 wherein the effective amount of stabilizer is from about 0.1 to about 5 percent by weight of copolymer resin weight.

6. The method of claim 1 wherein the effective amount of stabilizer is from about 0.5 to about 3 percent by weight of copolymer resin weight.

7. The method of claim 1 wherein the plasticizer is selected from the group consisting of epoxidized linseed oil and epoxidized soybean oil.

8. The method of claim 1 wherein the dispersion also generally uniformly has added thereto from about 0.01 to 0.5 percent by weight of copolymer resin weight of 2,6-di-tertiary-butyl-4-methyl phenol.

9. A particulate copolymer resin having improved stability against decomposition and being free of stabilizer particle agglomerates, the copolymer having polymerized therein a major amount of vinylidene chloride and at least one monoethylenically unsaturated monomer copolymerizable therewith, the copolymer being in uniform admixture with an effective amount of at least one oil insoluble particulate inorganic stabilizer, the improvement being imparted by first forming a generally uniform dispersion of the stabilizer in a liquid plasticizer dispersing medium and then placing the dispersion generally on and/or in the resin particles.

10. The resin of claim 9 wherein the monoethylenically unsaturated monomer is selected from the group consisting of methyl acrylate, butyl acrylate, methyl methacrylate, acrylic acid, methacrylic acid, itaconic acid and vinyl chloride.

11. The resin of claim 9 wherein the inorganic stabilizer is tetrasodium pyrophosphate.

12. The resin of claim 9 wherein the effective amount of stabilizer is from about 0.1 to about 10 percent by weight of copolymer resin weight.

13. The resin of claim 9 wherein the effective amount of stabilizer is from about 0.1 to about 5 percent by weight of copolymer resin weight.

14. The resin of claim 9 wherein the effective amount of stabilizer is from about 0.5 to about 3.0 percent by weight of copolymer resin weight.

15. The resin of claim 9 wherein the liquid plasticizer dispersing medium is selected from the group consisting of epoxidized linseed oil and epoxidized soybean oil.

16. The resin of claim 9 wherein the generally uniform dispersion of the stabilizer in the liquid plasticizer dispersing medium also has generally uniformly added thereto from about 0.01 to about 0.5 percent by weight of copolymer resin weight of 2,6-di-tertiary-butyl-4-methyl phenol.

* * * * *